United States Patent
Roberts et al.

(10) Patent No.: US 9,783,224 B1
(45) Date of Patent: Oct. 10, 2017

(54) STEERING SUPPORT RACK ASSEMBLY

(71) Applicants: Jonathan D Roberts, Glendale, AZ (US); Brent G Reynolds, Phoenix, AZ (US)

(72) Inventors: Jonathan D Roberts, Glendale, AZ (US); Brent G Reynolds, Phoenix, AZ (US)

(*) Notice: Subject to any disclaimer, the term of this patent is extended or adjusted under 35 U.S.C. 154(b) by 0 days.

(21) Appl. No.: 15/436,640

(22) Filed: Feb. 17, 2017

(51) Int. Cl.
*B62D 3/12* (2006.01)
*B62D 7/16* (2006.01)
*F16H 19/04* (2006.01)

(52) U.S. Cl.
CPC ............ *B62D 3/12* (2013.01); *B62D 7/163* (2013.01); *F16H 19/04* (2013.01)

(58) Field of Classification Search
CPC ............ B62D 3/12; B62D 7/163; F16H 19/04
USPC ................................................. 280/93.514
See application file for complete search history.

(56) References Cited

U.S. PATENT DOCUMENTS

| | | | | |
|---|---|---|---|---|
| 4,652,011 A | * | 3/1987 | Hollerweger | B62D 3/12 280/771 |
| 5,975,573 A | * | 11/1999 | Belleau | B62D 3/12 280/771 |
| 7,841,606 B2 | * | 11/2010 | Rey | B62D 3/12 180/427 |
| 8,454,039 B2 | * | 6/2013 | Murakami | B62D 3/12 180/400 |
| 9,193,377 B2 | * | 11/2015 | Pavuk | B62D 3/12 |
| 2010/0289238 A1 | * | 11/2010 | Archer | B62D 3/12 280/93.514 |
| 2012/0248724 A1 | * | 10/2012 | Watanabe | B62D 3/12 280/93.514 |

FOREIGN PATENT DOCUMENTS

JP WO-2016080480 A1 * 5/2016 ............ B62D 3/12

* cited by examiner

*Primary Examiner* — Faye M Fleming
(74) *Attorney, Agent, or Firm* — Booth Udall Fuller, PLC (57) ABSTRACT

A steering support rack assembly and method are disclosed. The steering support rack assembly includes a linear bearing with a sliding support shaft attached to a bracket at each end of the support shaft, where the brackets are also connected to a steering assembly and tie rods of a vehicle. A steering support rack assembly includes a pair of tie brackets with a support shaft assembly coupled between the tie brackets, such that the steering support rack assembly is configured to couple to a rack and pinion assembly and tie rod assemblies of a vehicle so that a shaft of the support shaft assembly moves in combination with the rack and pinion assembly to steer the vehicle with the tie rod assemblies and increase the strength and durability of the rack and pinion assembly.

20 Claims, 7 Drawing Sheets

STEERING SUPPORT RACK ASSEMBLY

BACKGROUND

1. Technical Field

Aspects of this document relate generally to a steering support rack assembly.

2. Background Art

The stock steering assembly of certain recreational and off-highway vehicles may prove to have insufficient strength for some off-road enthusiasts. Side-by-side recreational and utility vehicles are increasingly popular, but stock rack and pinion steering assemblies on these vehicles can be too weak to withstand the heavy abuse from rugged terrain and rigorous driving, which can lead to premature failure in the stock steering assembly. A need exists for an improved steering assembly for off-road vehicles that provides increased strength and durability.

SUMMARY

Aspects of this document relate generally to a steering support rack assembly. These aspects may comprise, and implementations may include, one or more or all of the components and steps set forth in the appended claims.

In a general aspect, a steering support rack assembly may include a linear bearing including: a sleeve having a sleeve length, an outer surface, a hollow interior portion, a first end portion, and a second end portion; a mounting member affixed to the outer surface of the sleeve, the mounting member being configured to couple to a frame of a vehicle; and a support shaft having a shaft length, a first end portion, and a second end portion, wherein the support shaft may be slidably housed in the hollow interior portion of the sleeve, and the shaft length may be longer than the sleeve length; a first bracket coupled to the first end portion of the support shaft, the first bracket being configured to couple to a first end portion of a rack and pinion assembly and a first tie rod; and a second bracket coupled to the second end portion of the support shaft, the second bracket being configured to couple to a second end portion of the rack and pinion assembly and a second tie rod.

In some aspects, a steering support rack assembly may include: a sleeve having a sleeve length, an outer surface, a hollow interior portion, a first end portion, and a second end portion; a mounting member affixed to the outer surface of the sleeve, the mounting member being configured to couple to a frame of a vehicle; a support shaft having a shaft length, a first end portion, and a second end portion, wherein the support shaft may be slidably housed in the hollow interior portion of the sleeve, and the shaft length may be longer than the sleeve length; a first bracket coupled to the first end portion of the support shaft, the first bracket being configured to couple to a first end portion of a rack and pinion assembly and a first tie rod; and a second bracket coupled to the second end portion of the support shaft, the second bracket being configured to couple to a second end portion of the rack and pinion assembly and a second tie rod.

In some aspects, a steering support rack assembly may include: a linear bearing having a support shaft slidably housed in a sleeve, the support shaft having a first end portion, and a second end portion, wherein the support shaft may have a shaft length longer than a length of the sleeve; a mounting member affixed to the linear bearing, the mounting member being configured to couple to a frame of a vehicle; a first bracket coupled to the first end portion of the support shaft, the first bracket being configured to couple to a first end portion of a rack and pinion assembly and a first tie rod; and a second bracket coupled to the second end portion of the support shaft, the second bracket being configured to couple to a second end portion of the rack and pinion assembly and a second tie rod.

In some further aspects, the steering support rack assembly may further include one or more of the following features. The support shaft may have a diameter between 1.5 and 6 cm. The support shaft may have a shaft length at least 1.5 times longer than a length of the sleeve. The support shaft may have a shaft length between 1.1 to 1.9 times longer than a length of the sleeve. The linear bearing further includes: a first bushing housed within the sleeve, the first bushing encasing at least a portion of the support shaft; and a second bushing housed within the sleeve, the second bushing encasing at least a portion of the support shaft. The linear bearing includes an acetal sleeve bushing. The linear bearing includes a sleeve bushing. The steering support rack assembly further includes: the rack and pinion assembly. The steering support rack assembly further includes: the first tie rod; and the second tie rod. The steering support rack assembly further includes: the rack and pinion assembly; the first tie rod; and the second tie rod. The steering support rack assembly further includes: a replacement rack configured to replace a stock rack of the rack and pinion assembly. The support shaft slides linearly in the linear bearing in conjunction with a rack of the rack and pinion assembly when the steering support rack assembly is coupled to the rack and pinion assembly and the rack is actuated by a gear or pinion gear. The support shaft may be approximately parallel to the rack. The support shaft may be approximately parallel to a rack of the rack and pinion assembly. The mounting member may be coupled directly or indirectly to a frame of an all-terrain vehicle ("ATV"), an off-highway vehicle ("OHV"), an off-road vehicle ("ORV"), a utility task vehicle ("UTV"), a recreational off-highway vehicle ("ROV"), or a side-by-side recreational or utility vehicle. The linear bearing may be chosen from a group including: a linear bearing having ball bearings; a linear bearing with the support shaft lubricated by direct contact with a lubricating oil or liquid; a plain bearing; a sleeve bearing; a linear bushing; a linear guide; and/or a linear slide. The first bracket further includes: a first bracket arm configured to couple to the first end portion of the support shaft; a first clevis configured to couple to a portion of the first tie rod; and a first rack contact surface configured to couple to the first end portion of a rack and pinion assembly. The second bracket further includes: a second bracket arm configured to couple to the second end portion of the support shaft; a second clevis configured to couple to a portion of the second tie rod; and a second rack contact surface configured to couple to the second end portion of a rack and pinion assembly.

Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features a steering support rack assembly. There are many features of a steering support rack assembly and method implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Structure/Components

There are a variety of implementations of a steering support rack assembly. Implementations of a steering support rack assembly may include: a linear bearing having a support shaft slidably housed in a sleeve, the support shaft having a first end portion, and a second end portion, wherein the support shaft has a shaft length longer than a length of the sleeve; a mounting member affixed to the linear bearing, the mounting member being configured to couple to a frame of a vehicle; a first bracket coupled to the first end portion of the support shaft, the first bracket being configured to couple to a first end portion of a rack and pinion assembly and a first tie rod; and a second bracket coupled to the second end portion of the support shaft, the second bracket being configured to couple to a second end portion of the rack and pinion assembly and a second tie rod.

Some implementations of a steering support rack assembly may include: a sleeve having a sleeve length, an outer surface, a hollow interior portion, a first end portion, and a second end portion; a mounting member affixed to the outer surface of the sleeve, the mounting member being configured to couple to a frame of a vehicle; a support shaft having a shaft length, a first end portion, and a second end portion, wherein the support shaft is slidably housed in the hollow interior portion of the sleeve, and the shaft length is longer than the sleeve length; a first bracket coupled to the first end portion of the support shaft, the first bracket being configured to couple to a first end portion of a rack and pinion assembly and a first tie rod; and a second bracket coupled to the second end portion of the support shaft, the second bracket being configured to couple to a second end portion of the rack and pinion assembly and a second tie rod.

Figure 1:
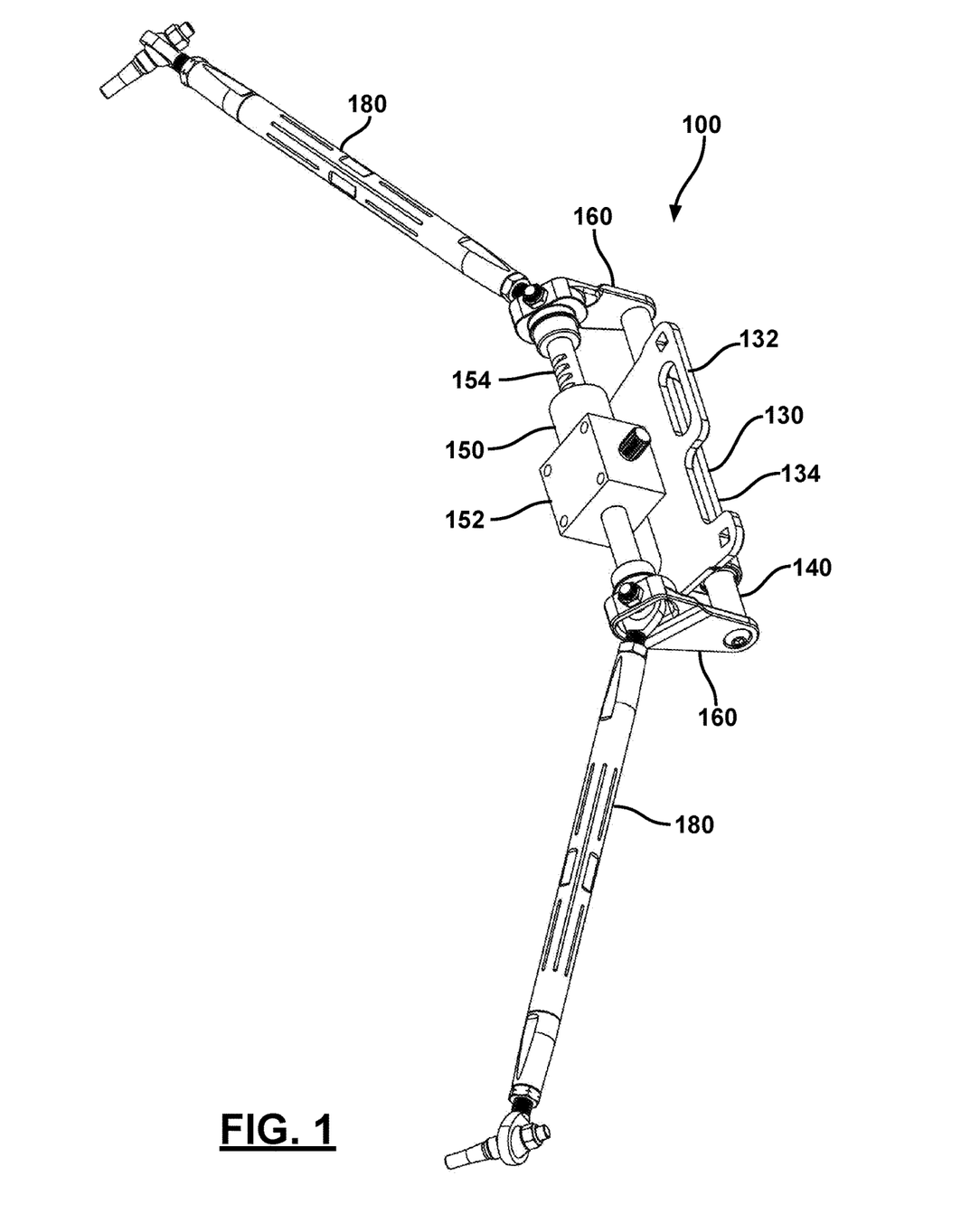
FIG. 1 is a rear perspective view of a non-limiting implementation of a steering support rack assembly.
Figure 2:
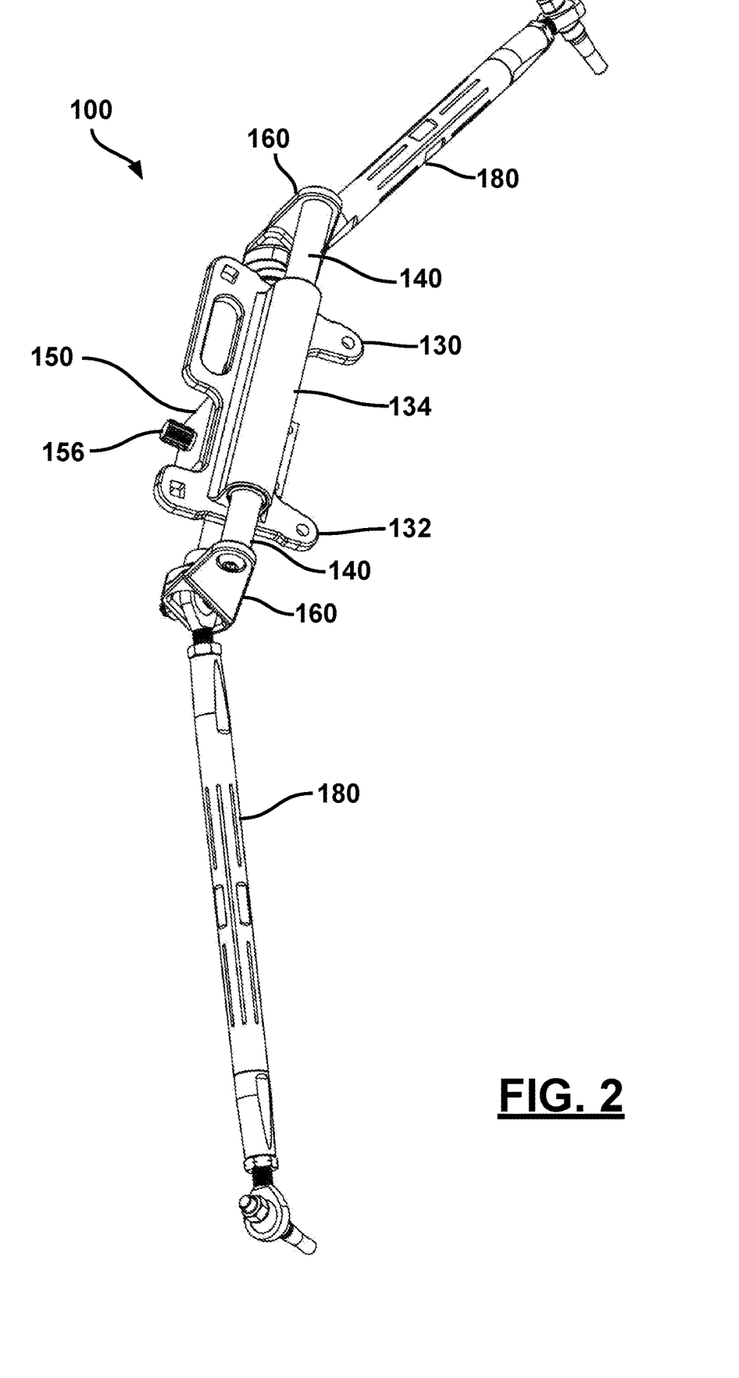
FIG. 2 is a front perspective view of a non-limiting implementation of a steering support rack assembly.

For the exemplary purposes of this disclosure, FIGS. 1 and 2 depict perspective views of a non-limiting implementation of a steering support rack assembly 100. According to some aspects, a steering support rack assembly 100 includes a pair of tie brackets 160 with a support shaft assembly 130 coupled between the tie brackets 160, such that the steering support rack assembly 100 is configured to couple to a rack and pinion assembly 150 and tie rod assemblies 180 of the vehicle so that a shaft 140 of the support shaft assembly 130 moves in combination with the rack and pinion assembly 150 to steer the vehicle with the tie rod assemblies 180.

In some implementations, the steering support rack assembly 100 includes a pair of tie brackets 160 with a support shaft assembly 130 and a rack and pinion assembly 150 coupled between the tie brackets 160, such that the steering support rack assembly 100 couples to tie rod assemblies 180 and is operable to steer a vehicle. In certain implementations, the steering support rack assembly 100 includes a pair of tie brackets 160 with a support shaft assembly 130 and a rack and pinion assembly 150 coupled between the tie brackets 160, and tie rod assemblies 180, where each of the tie brackets 160 is coupled to at least one separate tie rod assembly 180. According to one or more implementations, the steering support rack assembly 100 may be added as an aftermarket product to supplement and strengthen the stock steering assembly for the vehicle (e.g., some or most of the stock steering assembly is retained) or as an entire replacement of the stock steering assembly on a vehicle.

Figure 3:
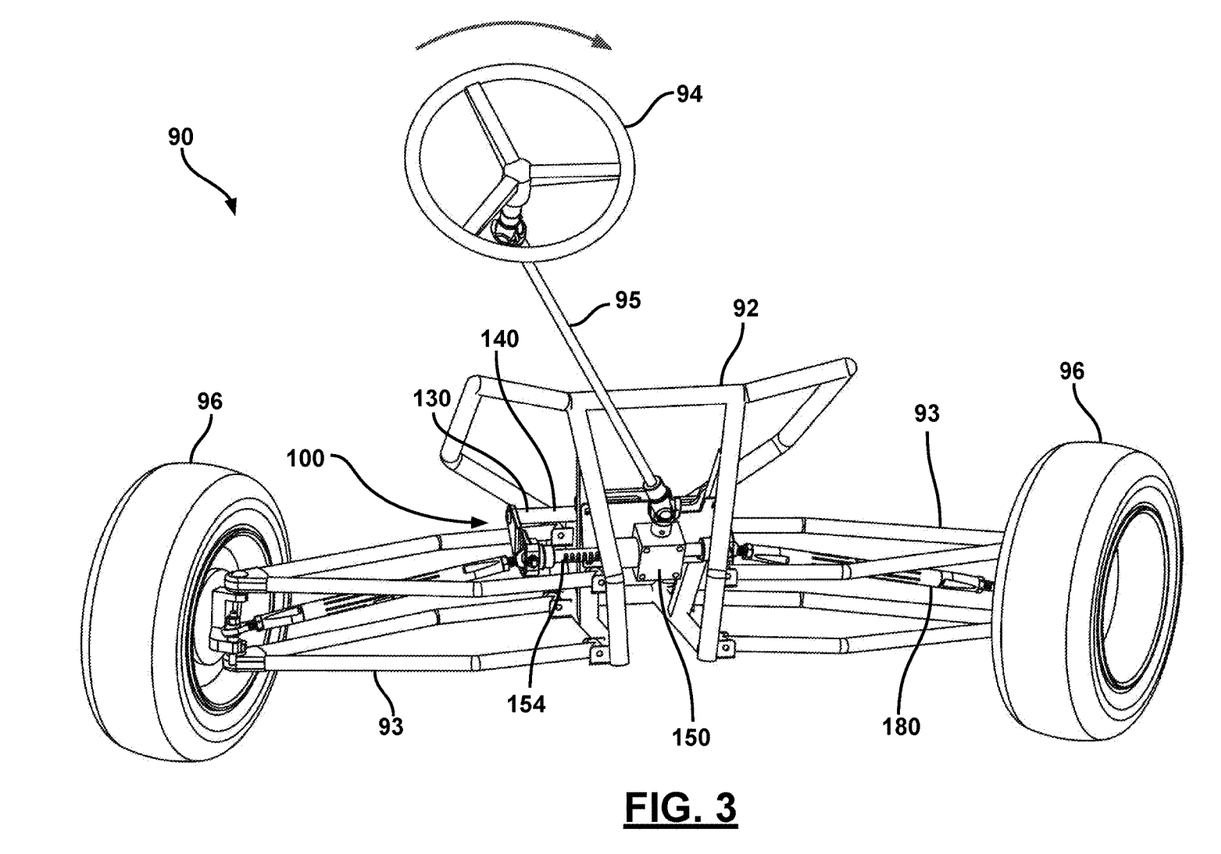
FIG. 3 is a partial rear view of a non-limiting implementation of a steering support rack assembly installed and being used on a frame of a vehicle.
Figure 4:
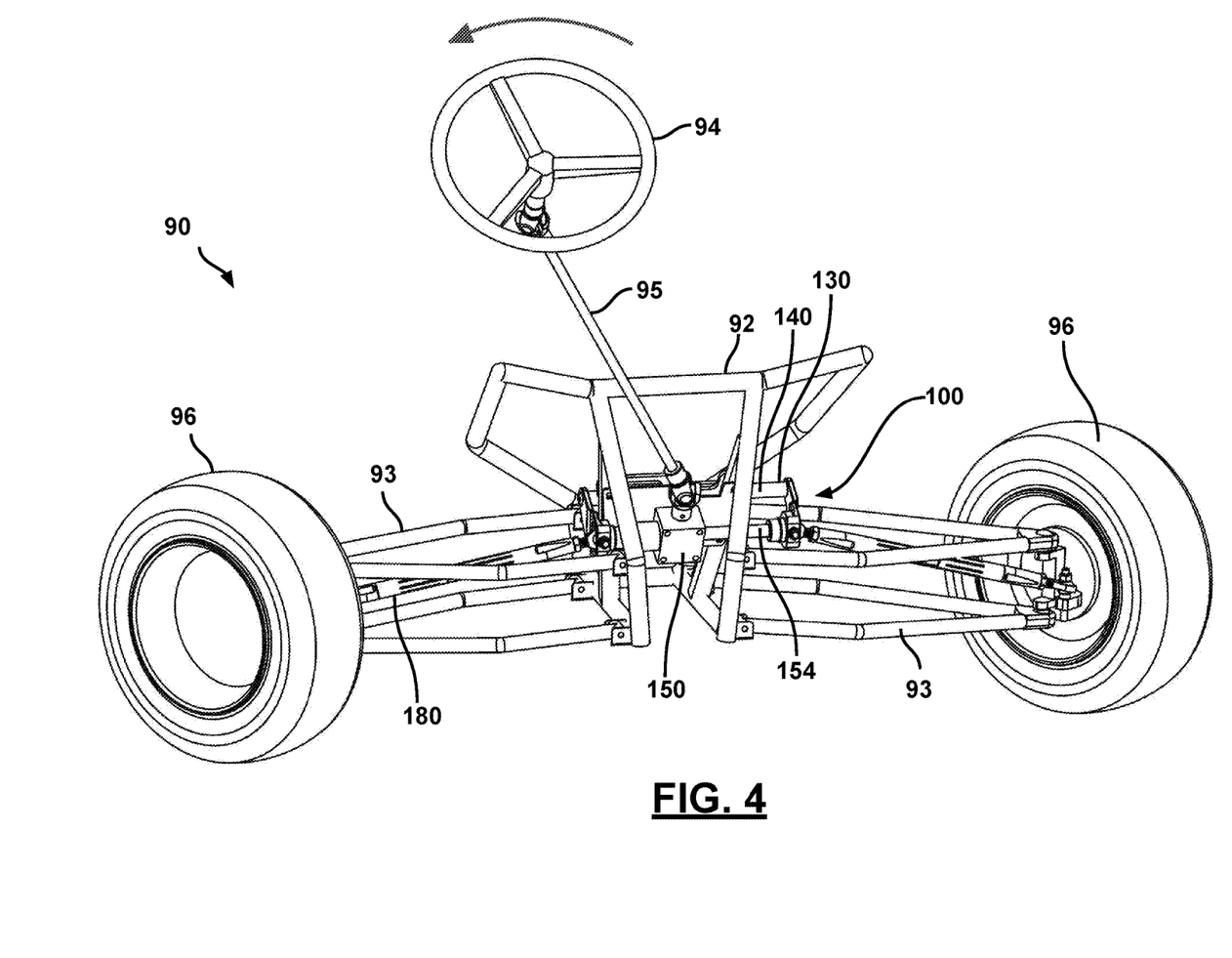
FIG. 4 is a partial rear view of a non-limiting implementation of a steering support rack assembly installed and being used on a frame of a vehicle.

FIGS. 3 and 4 depict partial rear views of a non-limiting implementation of a steering support rack assembly 100 installed and being used on a frame 92 of a vehicle 90. In some implementations, the steering support rack assembly 100 is used on a vehicle 90 including but not limited to: all-terrain vehicle ("ATV"), off-highway vehicle ("OHV"), off-road vehicle ("ORV"), utility task vehicle ("UTV"), recreational off-highway vehicle ("ROV"), side-by-side UTV or ROV, quad, quad bike, four-wheeler, snowmobile, dune buggy, or the like. In certain implementations, the steering support rack assembly 100 is used in a vehicle 90 that may experience high stresses or be driven with less care than normal, such as: golf carts, farm or ranch vehicles, construction vehicles, rental cars, commercial vehicles, go-carts, racing vehicles, mid- or light-duty snowplows, or other vehicles that encounter rugged terrain and/or abusive driving habits. In some implementations, the steering support rack assembly 100 is used on a side-by-side UTV or ROV vehicle 90 such as: a Polaris® RZR®, a Polaris® Ranger®, a Kawasaki® Mule™, Arctic Cat® Wildcat™, Arctic Cat® Prowler®, Can-Am® Maverick®, Can-Am® Maverick® X3, Yamaha® YXZ1000R®, Yamaha® Wolverine®, or other similar ROV or UTV vehicles currently existing or yet to be developed.

The partial rear views of FIGS. 3 and 4 show vehicle 90 viewed from the rear (i.e., showing a perspective similar to the driver's perspective) with major portions of vehicle 90 removed to make certain components visible. In FIG. 3, steering support rack assembly 100 is installed on frame 92 of vehicle 90 where the wheels 96 are turned to the driver's right when the steering wheel 94 is turned to the right (each of wheels 96 include, e.g., a rim and a tire). Wheels 96 are attached to suspension assembly 93, which may be a double wishbone suspension or a double A-arm suspension (as shown), or another type of suspension system. The suspension assembly 93 is attached to the frame 92. A steering wheel 94 operatively couples with the rack and pinion assembly 150 through the steering shaft 95. When the driver turns the steering wheel 94 to the right, both the rack 154 and the shaft 140 move to the left and the tie rod assemblies 180 operate to turn the wheels 96 towards the right. Conversely, FIG. 4 depicts the steering wheel 94 having been turned to the driver's left, causing both the rack 154 and the shaft 140 to move to the right, thereby causing the tie rod assemblies 180 to turn the wheels 96 towards the left. Although rack and pinion assembly 150 is generally depicted and described herein as a mechanical rack and pinion assembly, some implementations may employ alternative steering assemblies (which may or may not include a rack and pinion) including for example: power steering assemblies, power assisted steering assemblies, drive-by-wire steering assemblies, active steering assemblies, capstan and bowstring steering assemblies, recirculating ball steering assemblies, hydraulic steering rack and pinion assemblies, electric servo assist rack and pinion assemblies, worm drive rack and pinion assemblies, swing steer assemblies, cam action type steering assemblies, wireless steering assemblies, similar steering assemblies, or other steering assemblies yet to be developed.

Figure 5:
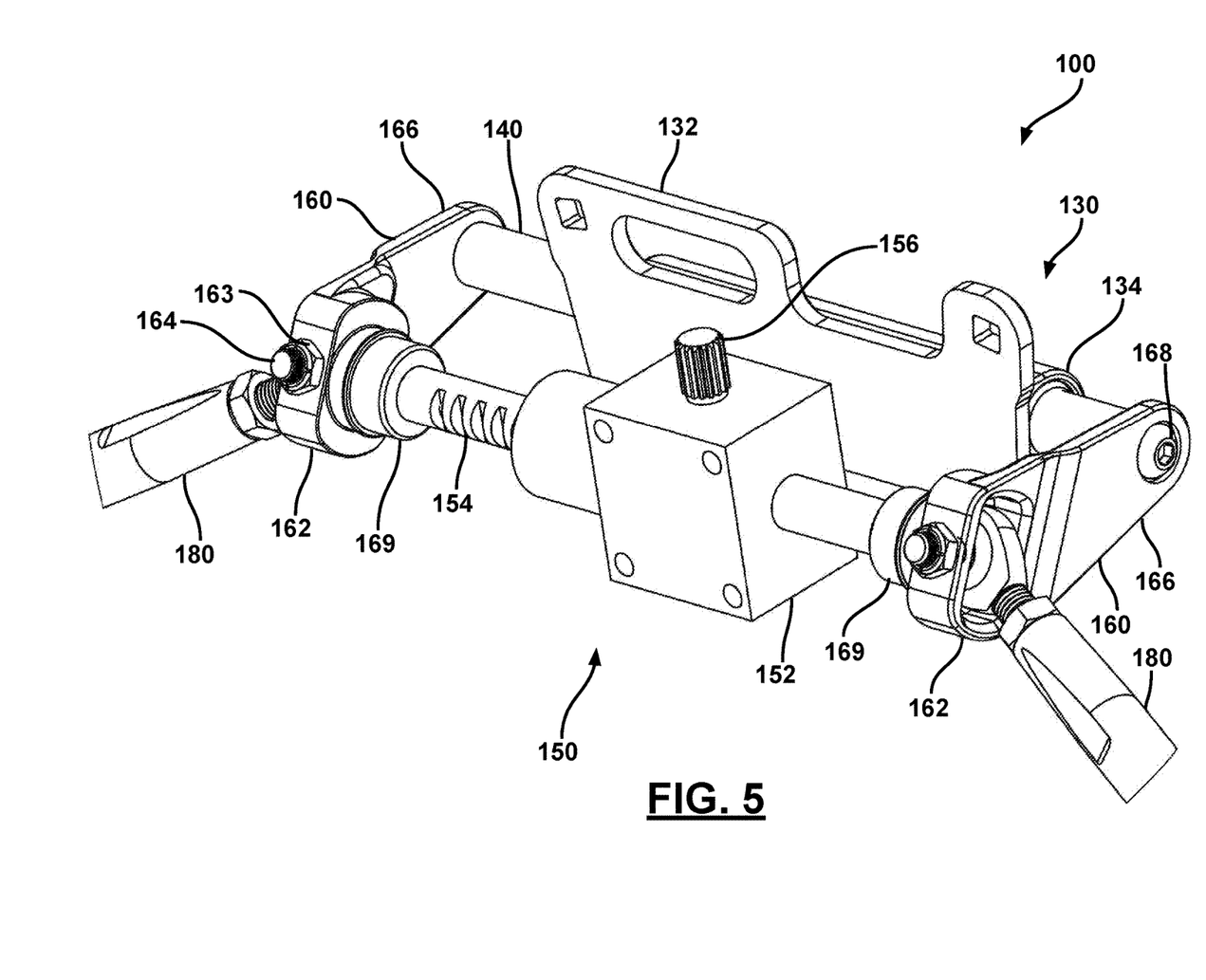
FIG. 5 is a rear perspective view of a non-limiting implementation of a steering support rack assembly.
Figure 6:
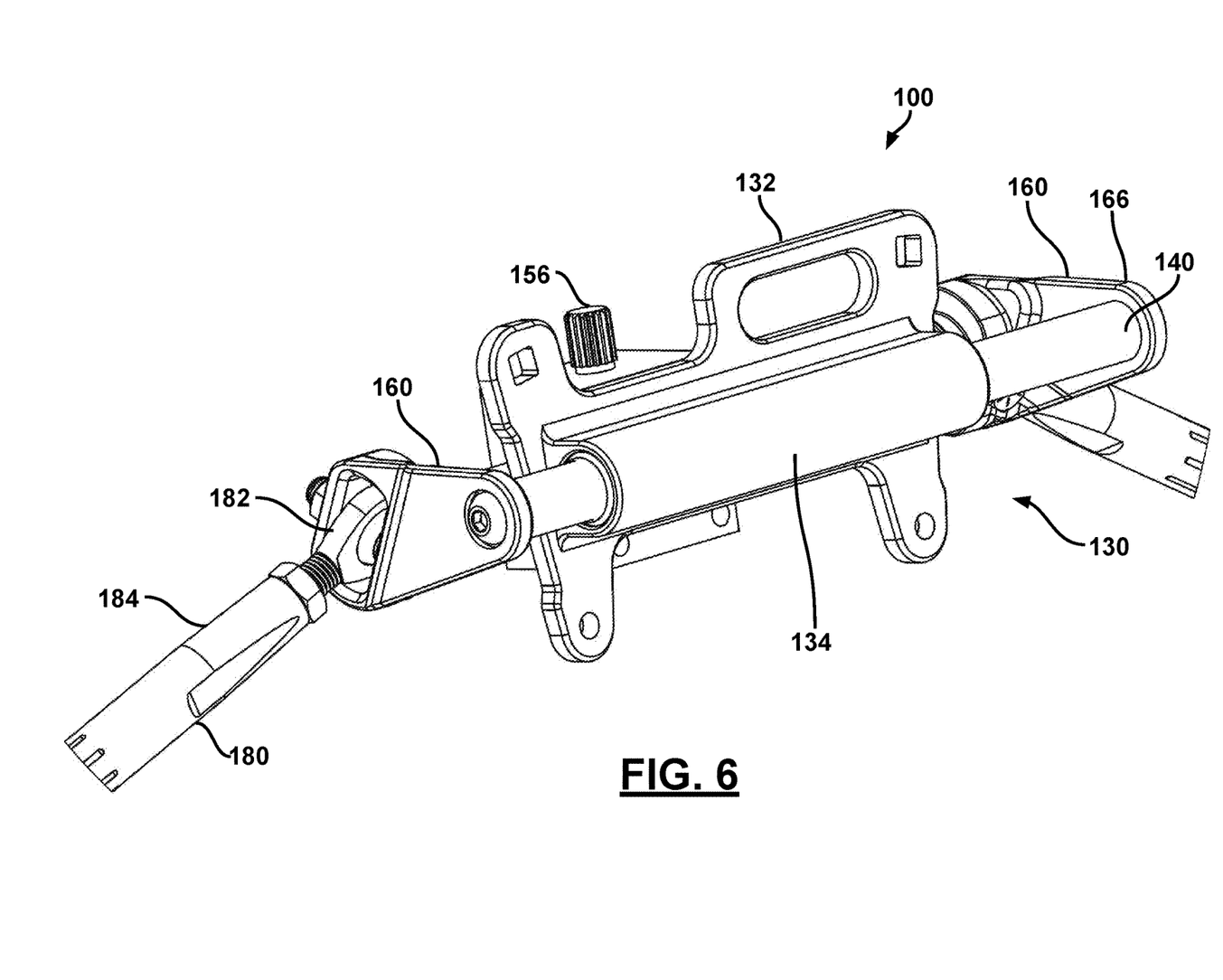
FIG. 6 is a front perspective view of a non-limiting implementation of a steering support rack assembly.
Figure 7:
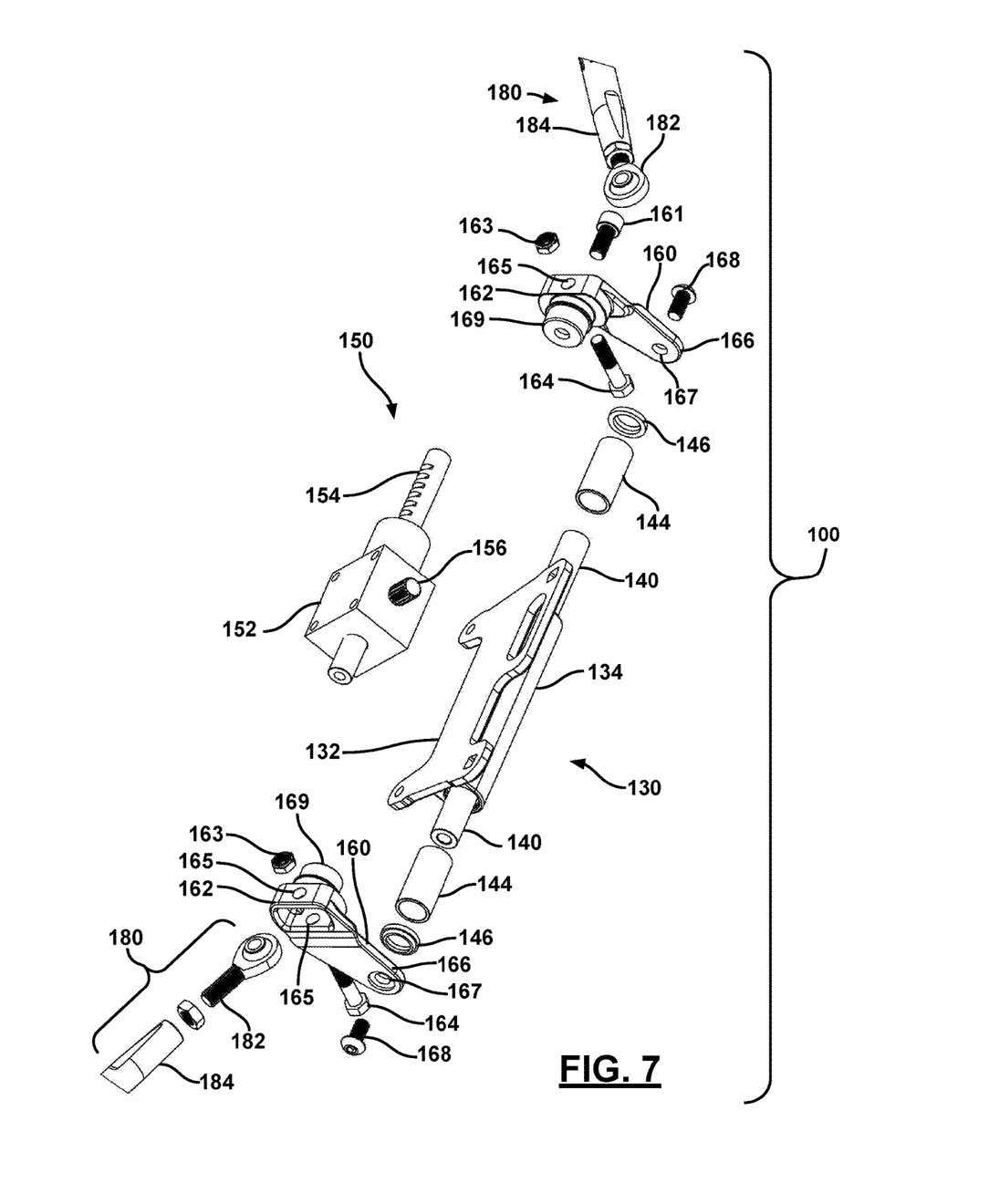
FIG. 7 is an exploded perspective view of a non-limiting implementation of a steering support rack assembly.

FIGS. 5 and 6 depict perspective views of a non-limiting implementation of a steering support rack assembly 100. FIG. 7 depicts an exploded perspective view of a non-limiting implementation of a steering support rack assembly 100. In one or more implementations, the steering support rack assembly 100 includes at least a pair of tie brackets 160 with a support shaft assembly 130 coupled between the tie rod brackets 160. Each of the tie brackets 160 is substantially similar, but configured to be positioned on opposite sides of the support shaft assembly 130 and rack and pinion assembly 150, thereby resulting in each tie rod bracket 160 being substantially a mirror image of the other tie bracket 160.

In some implementations, each tie rod bracket 160 couples to at least: the support shaft assembly 130, the rack and pinion assembly 150, and at least one of the tie rod assemblies 180. A tie rod bracket 160 includes a rack fastener housing 169, a clevis 162, and a bracket arm 166. The rack fastener housing 169 is configured to permit the tie rod bracket 160 to couple to the rack 154 of rack and pinion assembly 150. Tie rod bracket 160 may couple to rack 154 by passing bolt 161 through an aperture in the rack fastener housing 169 and threading bolt 161 (see FIG. 7) into an end portion of the rack 154, thereby contacting and fastening the rack 154 to at least a portion of the tie bracket 160. The rack fastener housing 169 may have a cavity or void for the head of bolt 161 to sit in and avoid obstructing the clevis 162. The clevis 162 is operable to couple with a tie rod assembly 180 using a fastener or coupler to couple to a tie rod assembly 180. Clevis 162 may couple to the tie rod assembly 180 by inserting bolt 164 through a rod end ball joint 182 and both clevis bolt apertures 165 and then fastening nut 163 on bolt 164. Each bracket arm 166 couples to one end portion of the support shaft assembly 130. The bracket arm 166 extends far enough from the rack fastener housing 169 and the frame 92 (see FIGS. 3 & 4) to couple to and provide room for the support shaft assembly 130. In some implementations, the length of the bracket arm 166 may be for example: 2 to 62 cm, 4 to 46 cm, 4 to 32 cm, 4 to 22 cm, or 5 to 12 cm measured from the clevis 162 to the point of fastening to the support shaft assembly 130 (e.g., the support bolt aperture 167). Bracket arm 166 couples to support shaft assembly by passing bolt 168 through the support bolt aperture 167 and threading bolt 168 into an end portion of shaft 140. Alternative fastening and coupling members may be used aside from bolts 161, 164, and 168 to couple one or more of the assemblies to tie bracket 160, including without limitation: adhesives, welds, pins, belts, bolts, buckles, clasps, latches, locks, screws, snaps, clamps, connectors, couplings, ties or other fastening means yet to be developed may be used in lieu of—or in conjunction with—any of the fasteners or fastening means discussed above.

In one or more implementations, the support shaft assembly 130 includes at least the mount 132 attached to the sleeve 134 that houses the shaft 140. The shaft 140 is configured to couple at each end to the tie rod bracket 160 using a fastener (e.g., with bolt 168 as shown). The shaft 140 has a length that is longer than the length of the sleeve 134 and the shaft 140 is allowed to move linearly in sleeve 134 by sliding back and forth. As depicted in FIGS. 3-5, shaft 140 slides back and forth together with the rack 154 as the rotating pinion member 156 of the gear box assembly 152 causes the rack 154 to slide back and forth as the steering wheel 94 is turned. The amount of travel the shaft 140 has to slide back and forth in the sleeve 134 may be for example: 1 cm to 40 cm, 5 to 20 cm, 7 to 15 cm, or 10 to 14 cm. One or more bushings 144 may be housed inside the sleeve 134 to couple the shaft 140 and the sleeve 134 to operate as a linear bearing or slide (see FIG. 7). Bushings 144 may be any one of various bushings and/or plain bearings (e.g., sleeve bushing, flanged bushing, multi-piece bushings, split bushing, etc.) and may utilize one or more lubrication or movement materials or mechanisms (e.g., lubricants, grease, ball bearings, polymer surfaces, or other lubricants or bearings). Grommets 146 (or washers, seals, or the like) may also be used to seal or protect bushings 144 housed within sleeve 134. The sleeve 134, bushings 144, and shaft 140 may operate together as: a linear bearing; a plain bearing; a sleeve bearing; a linear bushing; a linear guide; a linear slide; or another bearing, bushing, slide, or the like. The sleeve 134, bushings 144, and shaft 140 may operate together as: a linear bearing having ball bearings; a recirculating ball type linear bearing; a linear bearing with the shaft 140 lubricated by direct contact with a lubricating oil, grease, or liquid; or another bearing, bushing, or slide having ball bearings or being lubricated by oil or grease or other suitable lubrication substances or mechanisms. The sleeve 134, bushings 144, and shaft 140 may also operate together as a bearing, bushing, or slide without being lubricated by oil, grease, liquid, or other common lubrication substances or mechanisms.

According to some implementations, the shaft 140 has a generally cylindrical shape. The shaft 140 may have an elongated shape with a cross-section that is rectilinear, curvilinear, or irregular in shape and still operate to slide within sleeve 134. The diameter of the shaft 140 may be for example: 1 to 8 cm, 1.5 to 6 cm, 1.5 cm to 5.5 cm, 1.5 to 4.5 cm, or 2 to 3 cm. Instead of shaft 140, alternative implementations may employ a guide rail of any shape that accommodates a ball bearing carriage and/or a sleeve bearing carriage to slide and operate similar to shaft 140. The length of the shaft 140 may be for example: 6 to 60 cm, 8 cm to 40 cm, 22 to 50 cm, or 30 to 42 cm. The relative length of the shaft 140 may be: 1.1 to 4 times, 1.1 to 3 times, 1.1 to 2.8 times, or preferably 1.4 to 1.9 times longer than the length of the sleeve 134. The relative length of the shaft 140 may be at least: 1.3 times longer, 1.5 times longer, or 1.7 times longer than the length of the sleeve 134.

In some implementations, the shaft 140 and the rack 154 are positioned so that a long axis of each is parallel or approximately parallel (e.g., shaft 140 may be parallel to rack 154 to within a tolerance of ±3°, ±5°, or ±8°). In one or more implementations, one or both of the shaft and rack 154 are positioned to within a tolerance of ±5° or ±45° of being parallel to the axis of rotation of the nearest tire(s) 96 of the vehicle 90. In certain implementations, one or both of the shaft and rack 154 are positioned to within a tolerance of ±5° or ±15° of being parallel to a ground plane when the vehicle 90 rests on a flat ground plane.

Mount 132 of the support shaft assembly 130 is configured to couple to the frame 92 of vehicle 90 (see FIGS. 3 & 4 depicting vehicle 90). Mount 132 may have multiple apertures or holes allowing bolts or ties to secure to or around a portion of the frame 92. Mount 132 may be permanently affixed to or removably coupled to the frame using a variety of fasteners (e.g., locks, screws, snaps, clamps, connectors, welds, pins, couplings, ties, belts, bolts, buckles, clasps, latches, or the like). Mount 132 may be a universal mount configured to securely couple to at least two different types of vehicles 90 and/or to securely couple to at least two different locations on the frame 92 of at least one vehicle 90.

In some implementations, the rack and pinion assembly 150 is a stock or original equipment manufacturer ("OEM") rack and pinion assembly. Here, the steering support rack assembly 100 is added to the OEM rack and pinion assembly 150 by removing OEM brackets and replacing them with tie brackets 160. In alternative implementations, the entire rack and pinion assembly 150 is included as part of the steering support rack assembly 100. Here, adding the steering support rack assembly 100 to the vehicle 90 would include replacing the OEM rack and pinion assembly with a replacement rack and pinion assembly 150 (i.e., this replacement rack and pinion assembly 150 is one of the components of the steering support rack assembly 100) and also removing stock brackets and replacing them with tie brackets 160.

In some implementations, some but not all components of a stock or OEM rack and pinion assembly 150 are replaced with replacement components that are included as part of the steering support rack assembly 100. For example, a replacement rack 154 may replace an OEM rack. All or part of an OEM gear box assembly may be replaced with a gear box assembly 152 specifically configured to operate in the steering support rack assembly 100.

In some implementations, some or all components of a stock or OEM tie rod assembly 180 are replaced with replacement components that are included as part of the steering support rack assembly 100. For example, a replacement rod end ball joint 182 may replace an OEM rod end ball joint; a replacement tie rod 184 may replace an OEM tie rod; a replacement tie rod assembly 180 may replace an OEM tie rod assembly; and so forth.

The disclosed implementations of the steering support rack assembly 100 provide increased strength above and beyond the strength provided by an OEM rack and pinion assembly. The steering support rack assembly 100 helps to reduce or prevent rotation of the rack 154 when under linear and rotational stress, which helps reduce wear and tear on the gear box assembly 152. The improved handling of linear and radial stresses to the rack and pinion assembly 150 provided by the steering support rack assembly 100 increases stability and reduces the risk of steering loss or malfunction, thereby increasing the safety for users. The steering support rack assembly 100 may also decrease or dampen forces from the tie rod assemblies 180, which may allow for better control and steering during use Further implementations are within the claims and discussed elsewhere in this document.

Specifications, Materials, Manufacture, System, and Installation

It will be understood that steering support rack assembly implementations are not limited to the specific assemblies, devices and components disclosed in this document, as virtually any assemblies, devices and components consistent with the intended operation of a steering support rack assembly implementation may be utilized. Accordingly, for example, although particular sleeves, shafts, mounts, brackets, bearings, bushings, rack and pinion assemblies, hydraulic steering rack and pinion assemblies, electric servo assist rack and pinion assemblies, worm drive rack and pinion assemblies, swing steer assemblies, cam action type steering assemblies, wireless steering assemblies, other steering assemblies, other steering linkages, frames, tie rod assemblies, suspension assemblies, couplers, fasteners, positionable adjustment mechanisms, and other assemblies, devices and components are disclosed, such may include any shape, size, style, type, model, version, class, measurement, concentration, material, weight, quantity, and/or the like consistent with the intended operation of a steering support rack assembly implementation. Implementations are not limited to uses of any specific assemblies, devices and components; provided that the assemblies, devices and components selected are consistent with the intended operation of a steering support rack assembly implementation.

Accordingly, the components defining any steering support rack assembly implementations may be formed of any of many different types of materials or combinations thereof that can readily be formed into shaped objects provided that the components selected are consistent with the intended operation of a steering support rack assembly implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, chromium-molybdenum steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

Various steering support rack assembly implementations may be manufactured using conventional procedures as added to and improved upon through the procedures described here. Some components defining steering support rack assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, machining, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g., a bolt, a nut, a screw, a nail, a rivet, a pin, and/or the like), wiring, any combination thereof, and/or the like for example, depending on, among other considerations, the particular material forming the components.

It will be understood that the assembly of steering support rack assemblies are not limited to the specific order of steps as disclosed in this document. Any steps or sequence of steps of the assembly of steering support rack assemblies indicated herein are given as examples of possible steps or sequence of steps and not as limitations, since various assembly processes and sequences of steps may be used to assemble steering support rack assemblies.

What is claimed is:

1. A steering support rack assembly, comprising:
   a linear bearing comprising:
     a sleeve having a sleeve length, an outer surface, a hollow interior portion, a first end portion, and a second end portion;
     a mounting member affixed to the outer surface of the sleeve, the mounting member being configured to couple to a frame of a vehicle; and
     a support shaft having a shaft length, a first end portion, and a second end portion, wherein the support shaft is slidably housed in the hollow interior portion of the sleeve, and the shaft length is longer than the sleeve length;
   a first bracket coupled to the first end portion of the support shaft, the first bracket being configured to couple to a first end portion of a rack and pinion assembly and a first tie rod; and
   a second bracket coupled to the second end portion of the support shaft, the second bracket being configured to couple to a second end portion of the rack and pinion assembly and a second tie rod.

2. The steering support rack assembly of claim 1, wherein the linear bearing comprises an acetal sleeve bushing.

3. The steering support rack assembly of claim 1, wherein the support shaft is approximately parallel to a rack of the rack and pinion assembly.

4. The steering support rack assembly of claim 1, wherein the mounting member is coupled to a frame of an all-terrain vehicle ("ATV"), an off-highway vehicle ("OHV"), an off-road vehicle ("ORV"), a utility task vehicle ("UTV"), a recreational off-highway vehicle ("ROV"), or a side-by-side recreational or utility vehicle.

5. A steering support rack assembly, comprising:
   a sleeve having a sleeve length, an outer surface, a hollow interior portion, a first end portion, and a second end portion;
   a mounting member affixed to the outer surface of the sleeve, the mounting member being configured to couple to a frame of a vehicle;
   a support shaft having a shaft length, a first end portion, and a second end portion, wherein the support shaft is slidably housed in the hollow interior portion of the sleeve, and the shaft length is longer than the sleeve length;
   a first bracket coupled to the first end portion of the support shaft, the first bracket being configured to couple to a first end portion of a rack and pinion assembly and a first tie rod; and
   a second bracket coupled to the second end portion of the support shaft, the second bracket being configured to couple to a second end portion of the rack and pinion assembly and a second tie rod.

6. The steering support rack assembly of claim 5, wherein the steering support rack assembly further comprises:
   the rack and pinion assembly;
   the first tie rod; and
   the second tie rod.

7. The steering support rack assembly of claim 5, wherein the support shaft slides linearly in the sleeve in conjunction with a rack of the rack and pinion assembly when the steering support rack assembly is coupled to the rack and pinion assembly and the rack is actuated by a gear.

8. The steering support rack assembly of claim 5, wherein the support shaft is approximately parallel to a rack of the rack and pinion assembly.

9. The steering support rack assembly of claim 5, wherein the support shaft has a shaft length between 1.1 to 1.9 times longer than a length of the sleeve.

10. The steering support rack assembly of claim 5, wherein the linear bearing comprises a sleeve bushing.

11. The steering support rack assembly of claim 5, wherein the first bracket further comprises:
    a first bracket arm configured to couple to the first end portion of the support shaft;
    a first clevis configured to couple to a portion of the first tie rod; and
    a first rack contact surface configured to couple to the first end portion of a rack and pinion assembly.

12. The steering support rack assembly of claim 11, wherein the second bracket further comprises:
    a second bracket arm configured to couple to the second end portion of the support shaft;
    a second clevis configured to couple to a portion of the second tie rod; and
    a second rack contact surface configured to couple to the second end portion of a rack and pinion assembly.

13. A steering support rack assembly, comprising:
a linear bearing having a support shaft slidably housed in a sleeve, the support shaft having a first end portion, and a second end portion, wherein the support shaft has a shaft length longer than a length of the sleeve;
a mounting member affixed to the linear bearing, the mounting member being configured to couple to a frame of a vehicle;
a first bracket coupled to the first end portion of the support shaft, the first bracket being configured to couple to a first end portion of a rack and pinion assembly and a first tie rod; and
a second bracket coupled to the second end portion of the support shaft, the second bracket being configured to couple to a second end portion of the rack and pinion assembly and a second tie rod.

14. The steering support rack assembly of claim 13, wherein the support shaft has a shaft length at least 1.1 times longer than a length of the sleeve.

15. The steering support rack assembly of claim 13, wherein the steering support rack assembly further comprises:
the rack and pinion assembly.

16. The steering support rack assembly of claim 13, wherein the steering support rack assembly further comprises:
a replacement rack configured to replace a stock rack of the rack and pinion assembly.

17. The steering support rack assembly of claim 13, wherein the support shaft slides linearly in the linear bearing in conjunction with a rack of the rack and pinion assembly when the steering support rack assembly is coupled to the rack and pinion assembly and the rack is actuated by a gear.

18. The steering support rack assembly of claim 17, wherein the support shaft is approximately parallel to the rack.

19. The steering support rack assembly of claim 13, wherein the linear bearing further comprises:
a first bushing housed within the sleeve, the first bushing encasing at least a portion of the support shaft; and
a second bushing housed within the sleeve, the second bushing encasing at least a portion of the support shaft.

20. The steering support rack assembly of claim 13, wherein the linear bearing is selected from the group consisting of:
a linear bearing having ball bearings;
a linear bearing with the support shaft lubricated by direct contact with a lubricating oil or liquid;
a plain bearing;
a sleeve bearing;
a linear bushing;
a linear guide; and
a linear slide.

* * * * *